E. C. GREINER.
OVEN.
APPLICATION FILED MAY 4, 1916.

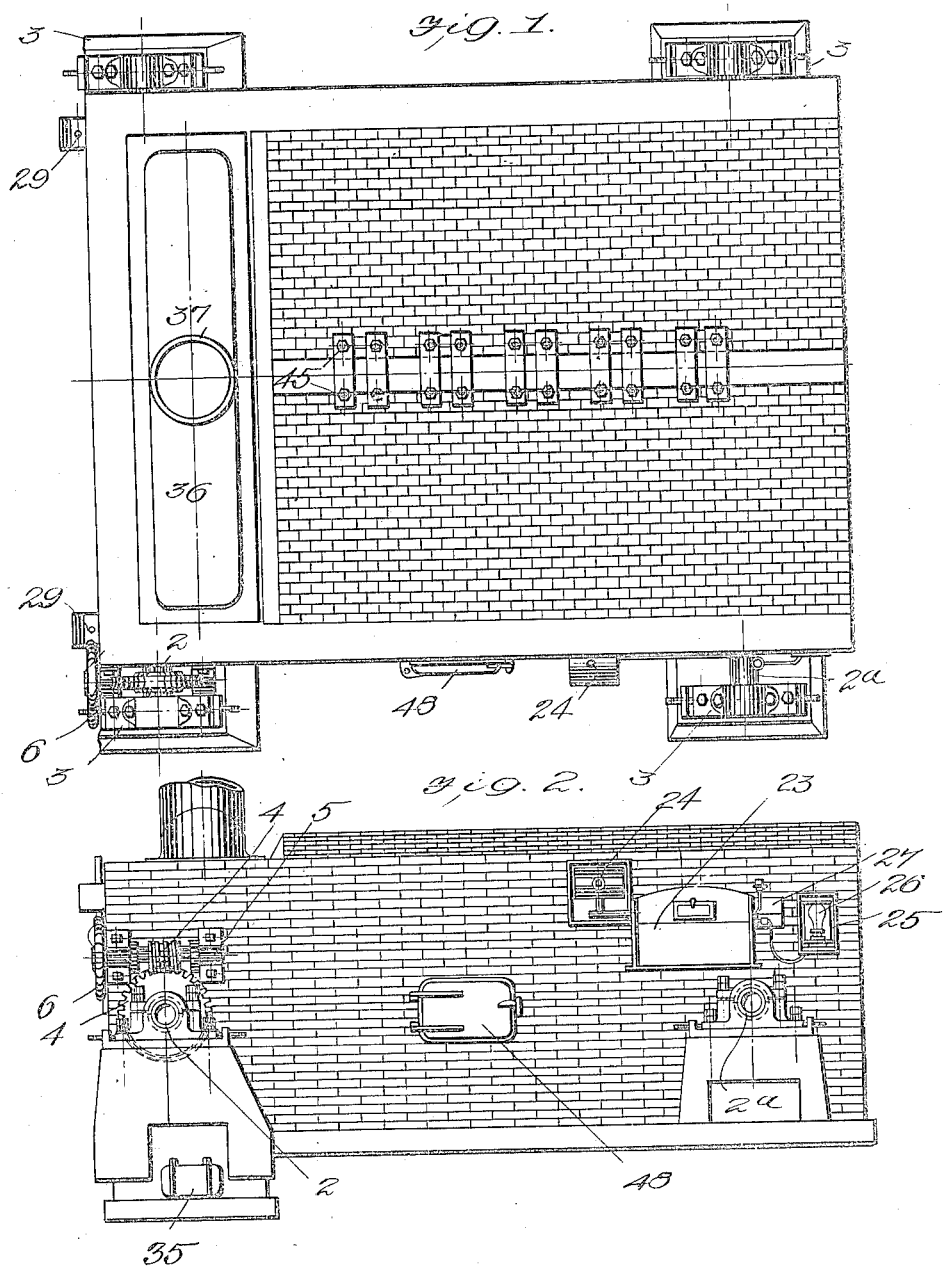

1,215,144.

Patented Feb. 6, 1917.
3 SHEETS—SHEET 2.

WITNESSES:
F. C. Barry
C. E. Trainor

INVENTOR
Emil C. Greiner
BY
Munn & Co.
ATTORNEYS

E. C. GREINER.
OVEN.
APPLICATION FILED MAY 4, 1916.
1,215,144.
Patented Feb. 6, 1917.
3 SHEETS—SHEET 3.
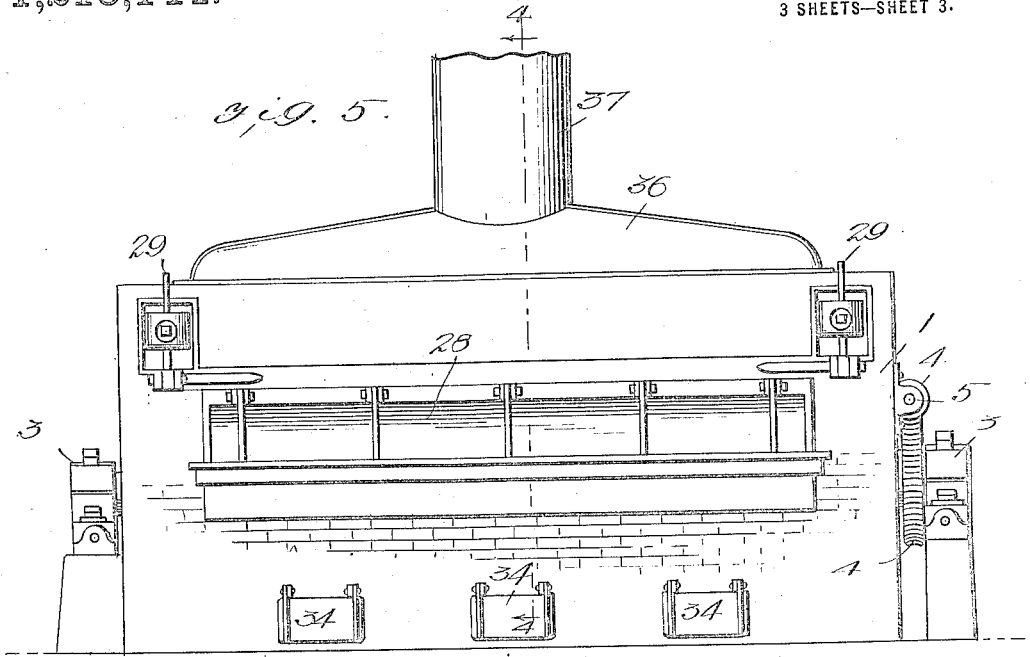
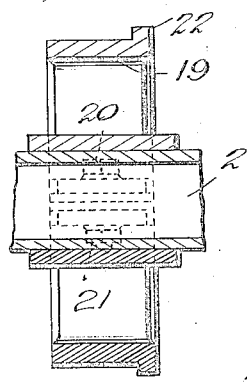
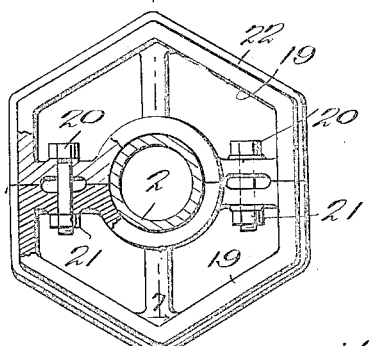
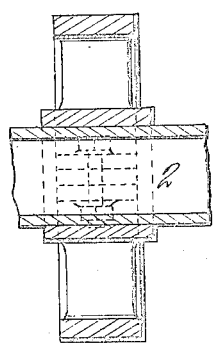
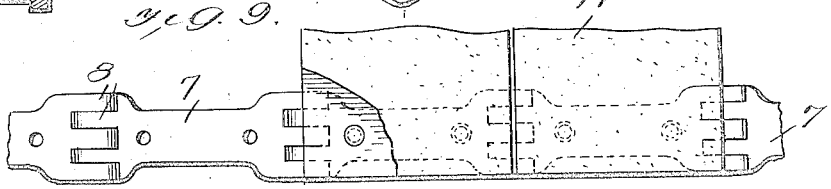
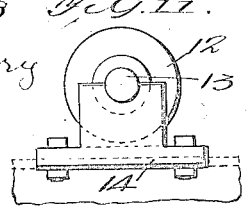
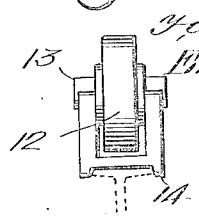
WITNESSES:
F. C. Barry
C. E. Trainor
INVENTOR
Emil C. Greiner
BY
ATTORNEYS

UNITED STATES PATENT OFFICE.

EMIL CHRISTIAN GREINER, OF GLOBE, ARIZONA.

OVEN.

1,215,144.

Specification of Letters Patent. Patented Feb. 6, 1917.

Application filed May 4, 1916. Serial No. 95,343.

*To all whom it may concern:*

Be it known that I, EMIL CHRISTIAN GREINER, a citizen of the United States, and a resident of Globe, in the county of Gila and State of Arizona, have invented a new and useful Improvement in Ovens, of which the following is a specification.

My invention is an improvement in ovens, and has for its object to provide an oven especially adapted for baking bread and the like, wherein an endless carrier is provided arranged to support the material to be baked upon its upper run, and having horizontal plates connected therewith for supporting the material, and having means for moving the endless carrier together with an improved form of heating mechanism, consisting of a series of substantially U-shaped tubes arranged alongside each other with their arms in register, each connected with the heating chamber at one end below the endless carrier and with the smoke chamber at the other above the endless carrier, said endless carrier being between the upper and lower arms of the tubes.

In the drawings:—

Figure 1 is a top plan view of the oven,

Fig. 2 is a side view,

Fig. 5 is a view looking at the discharge end of the oven.

Fig. 6 is a side view of one of the flanged wheels with parts in section,

Fig. 7 is a section on the line 7—7 of Fig. 6, looking in the direction of the arrows adjacent to the line, Fig. 8 is a sectional view of one of the inner flangeless wheels, Fig. 9 is a top plan view of a portion of the carrier, Fig. 10 is a side view with parts in section, Fig. 11 is a side view of one of the supporting wheels for the carrier, and Fig. 12 is a front view of the same.

Figure 3:
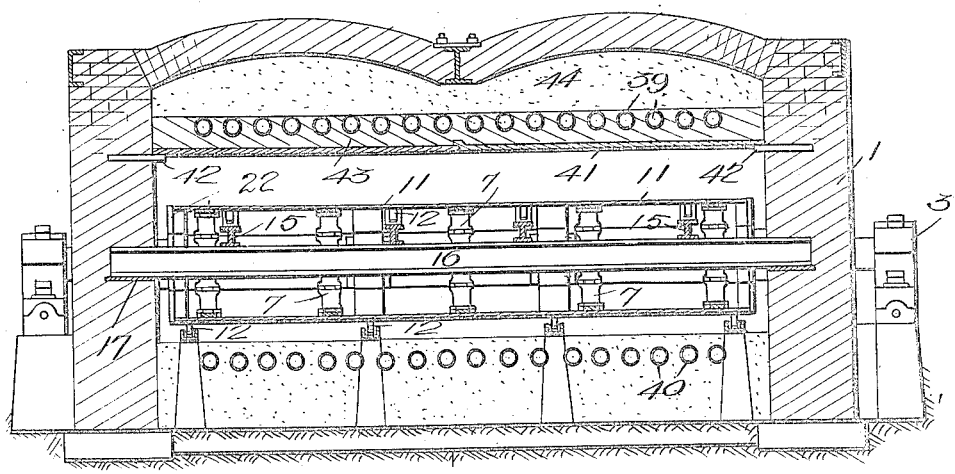
Fig. 3 is a transverse vertical section.

The oven comprises a casing 1, and hollow shafts 2 and $2^a$ are journaled transversely of the casing at the ends thereof, the said shafts extending through the oven walls as shown, and being journaled in bearing supports 3 outside of the casing. The shaft 2 is provided with a worm wheel 4 between the casing wall and the bearing support 3, and this worm wheel is engaged by a worm on a worm shaft 5, which is journaled in bearing brackets above the worm wheel. The shaft 5 has a hand wheel 6 for convenience in turning the same, and it will be obvious that by means of the hand wheel the shaft 2 may be turned.

A series of wheels of hexagonal outline is secured on each shaft 2 and $2^a$ in spaced relation and the endless carrier to be described, is supported by the wheels. The wheels of the shaft 2 and $2^a$ register and the endless carrier is composed of a series of chains, the number of chains corresponding to the number of wheels on a shaft, and each chain is composed of links 7, which have spaced bearings 8 at their ends adapted to be received between the bearings of adjacent links and pivoted thereto by means of a pivot pin $9^a$.

In the present instance, five chains are provided, and the corresponding links of the five chains are connected by plates 9 of metal, the said plates being secured to the chains by means of rivets 10 as shown, and each plate is provided on its upper face with a facing 11 of heat resisting material as for instance, asbestos. The bread or other material to be baked is laid on the asbestos facing of the plates, and by means of the hand wheel 6 the endless carrier may be moved to move the bread longitudinally of the oven.

The upper and lower runs of the endless carrier are supported in a horizontal plane and against sagging by means of wheels 12, each of which is secured to a shaft or axle 13, which is journaled in open bearings in a bearing casing 14, arranged below the adjacent run of the carrier. The bearing casings 14 at the upper run of the carrier are supported by I beams 15, which in turn are supported by other I beams 16, extending transversely of the oven casing and resting at their ends on metal strips $17^a$, set in the casing walls. The bearing casings 14 at the lower run of the carrier are supported on bars 17, extending longitudinally of the furnace and resting upon standards or columns 18.

The carrier supporting wheels as shown in Figs. 6, 7 and 8 are sectional, each consisting of similar sections 19 which have recesses for receiving the shaft 2 or $2^a$, as the case may be, and the sections are clamped on the shaft by means of bolts 20, which are passed through registering openings in the sections on each side of the shaft and are engaged by nuts 21 to prevent displacement of the bolts and to clamp the sections on the shaft. The endmost wheels of each shaft are flanged at their outer faces as shown at 22 in Figs. 7 and 8, while the intermediate wheels are not flanged, having plain peripheries as shown in Fig. 8.

The casing is provided with a door opening in its side wall and at the end remote from the hand wheel 6, and the said door opening is normally closed by a door 23, which is provided with counterbalancing mechanism 24, secured to the pintle of the door for convenience in opening the door. The casing or oven is also provided with a sight opening adjacent to the door, and illuminating mechanism 26 is arranged in the sight opening, the said mechanism being in the present instance an incandescent electric bulb.

A switch 27 is arranged between the sight opening and the door 23 for permitting the bulb to be connected with its circuit, and when the bulb is so connected the interior of the oven casing will be lighted to permit the operator to correctly arrange the bread on the plates. The bread is carried slowly through the oven casing as it is fed to the plates and eventually arrives at the opposite end of the casing where a door opening is provided extending the full width of the carrier and normally closed by a door 28, which has counterweights 29 connected with its pintles for convenience in opening and closing the door.

Both the door 23 and the door 28 open inward as shown, and the doors are opened by swinging the arms of the counterweights downward. The weights of the counterweights are adjustable on the arms and are held in adjusted position by means of set screws as shown. Each of these weights when the door is closed, is received within a recess in the casing wall as shown in Figs. 4 and 5.

The oven casing is provided with a furnace or combustion chamber at the end adjacent to the door 28, and extending transversely of the casing, and the said chamber 30 is separated from the baking chamber or oven proper by means of an arched plate 31, which forms a cover for the combustion chamber and forms a partition between the said chamber and the oven proper. A grate 32 is arranged transversely of the chamber at a suitable height, and a series of feeding openings 33, three in the present instance, is provided above the grate, opening at that end of the oven adjacent to the door 28. Each opening is closed normally at its outer end by means of a feed door 34, and an ash removing door 35 is provided below the grate, and at the end adjacent to the hand wheel 6.

The smoke chamber 36 is directly above the combustion chamber being at the same end of the oven casing and extending the full width of the said casing, and a flue or discharge pipe 37 leads from the center of the said chamber. This chamber is of steel, and the smoke receiving chamber is connected with the combustion chamber by heating pipes of U-shape as shown in Fig. 4. Each of the said heating pipes comprises a body 38 and upper and lower arms 39 and 40, respectively, and the endless carrier is between the arms of the series. The arms 39 are arranged in one plane above the carrier and the arms 40 are arranged in a lower plane below the carrier, and the free or outer ends of the arms communicate with the smoke receiving chamber and with the combustion chamber, respectively.

Figure 4:
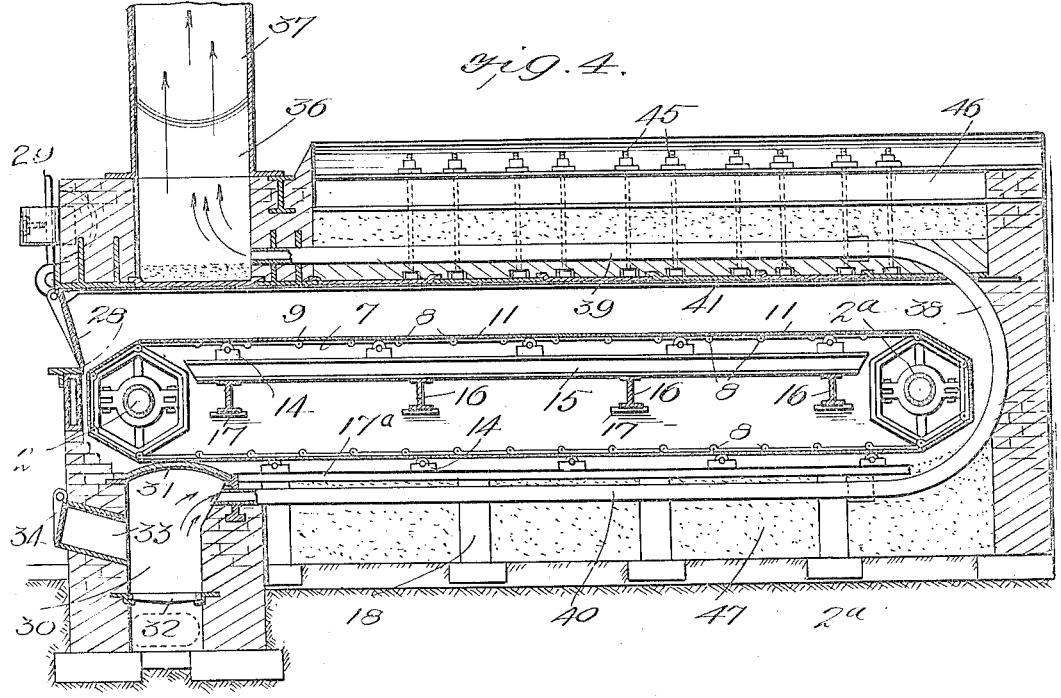
Fig. 4 is a section on the line 4—4 of Fig. 5, looking in the direction of the arrows adjacent to the line.

It will be noticed from an inspection of Fig. 4 that the upper part of the rear or inner wall of the combustion chamber is battered or inclined, and that the arms 40 open at this inclination. The heated products of combustion enter the open ends of the arms 40, pass through the said arms and through the body 38 of the tubes or pipes, through the arms 39 of the tubes or pipes, the said arms delivering to the smoke chamber 36, and practically all of the heat is given up to the baking chamber or oven proper.

The hearth plates 41 rest at their ends on supporting plates 42 embodied in the casing walls, and these hearth plates carry a layer 43 of loam or clay in which the arms 39 of the heating tubes are embodied. Sand indicated at 44 is arranged above the layer 43 extending from the said layer to the arches which close the top of the casing. The hearth plates are supported at the center by tie rods 45 which connect the said plates with the I beams 46 between the top arches. The arms 40 of the heating tubes are embodied in sand indicated at 47. Preferably the hearth plates are ribbed, the said ribs tapering from the ends to the center for reinforcing the plates.

In operation, the material to be baked, as for instance bread, is fed through the receiving door 23, the operator lifting the said door by means of the counterbalance 24 to permit the insertion of the material. As each of the plates 11 receives its filling of material the wheel 6 is turned to move the endless carrier toward the smoke chamber 22, that is, toward the opposite end of the casing.

By means of the switch 27 the bulb 26 may be lighted, and the operation of placing the bread on the plates may be observed. The counterweights 24 and 29 are arranged to hold the doors open or closed. When these counterweighted arms are in vertical position as shown, the doors will be held closed, while when the arms are turned down into horizontal position the doors will be held open. Any suitable form of fuel may be used as for instance, coal, oil, gas, or the like, it being understood that the combustion chamber is provided with a suitable form of heating device. The coils of U-shaped tubes lying as they do in the sand will heat the sand, and when the sand and tubes are hot the oven proper will be highly heated.

A door or manhole 48 is provided in the same side which has the door 23 for permitting inspection of the wheels 12, or to permit removal and replacement of the same. The chains are held in proper position on the wheels by means of the flanges 22 which engage the ends of the plates 9 and prevent movement of the said plates laterally of the carrier.

It will be noted that the body portions of the pipes which serve as flue pipes are arranged within the baking chamber, while the arms are within the walls of the oven, and that the conveying means conveys the loaves to be baked from that end adjacent to the exposed bodies of the pipes toward the combustion chamber. With this arrangement, that portion of the baking chamber which is not exposed to the direct radiation from the combustion chamber is supplied with excess heat by the exposed bodies of the flues. It will be evident that the hottest portion of the baking chamber will be at the combustion chamber, and that the temperature will decrease toward the opposite end. Hence the conveying means is arranged to carry the loaves from the coolest portion of the chamber to the hottest portion. Were the loaves inserted in the hottest part of the oven first, they would become browned and burn, while by moving them from the coolest to the hottest end they are thoroughly baked throughout. The exposed bodies of the heating pipes will make an excess heat at the adjacent end, that will quickly warm the loaves, without burning them, however, and as they gradually move toward the combustion chamber they will be completely baked.

I claim:—

An oven having a baking chamber and having at one end thereof and below the same a combustion chamber, and having above the said baking chamber at the said end a smoke receiving chamber, and a series of U-shaped pipes connecting the combustion and the smoke receiving chambers, each pipe comprising a body portion at the opposite end of the baking chamber from the combustion chamber, and arms arranged above and below the said baking chamber and connected with the combustion and smoke receiving chambers, said arms being arranged within the walls of the oven and the body portions being within the baking chamber, and means for conveying the loaves to be baked from the opposite end toward the combustion chamber.

EMIL CHRISTIAN GREINER.